US009706038B1

United States Patent
Dow et al.

(10) Patent No.: US 9,706,038 B1
(45) Date of Patent: Jul. 11, 2017

(54) RADIO LOCATOR APPLICATION

(71) Applicant: International Business Machines Corporation, Armonk, NY (US)

(72) Inventors: Eli M. Dow, Wappingers Falls, NY (US); James P. Gilchrist, Milford, CT (US); Brendan C. Lewis, Williamsville, NY (US); Khaalid McMillan, Wappingers Falls, NY (US); Christopher J. Nycz, Wallkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/994,636

(22) Filed: Jan. 13, 2016

(51) Int. Cl.
| | |
|---|---|
| *H04B 1/18* | (2006.01) |
| *H04M 1/725* | (2006.01) |
| *H04L 29/06* | (2006.01) |
| *H04W 4/00* | (2009.01) |
| *H04W 72/08* | (2009.01) |
| *H04B 1/3822* | (2015.01) |
| *H04B 1/16* | (2006.01) |

(52) U.S. Cl.
CPC ...... *H04M 1/72533* (2013.01); *H04B 1/3822* (2013.01); *H04L 65/4076* (2013.01); *H04W 4/008* (2013.01); *H04W 72/085* (2013.01)

(58) Field of Classification Search
CPC .......... H04H 60/41–60/47; H04H 60/51
USPC ............... 455/179.1, 184.1, 185.1
See application file for complete search history.

(56) References Cited

U.S. PATENT DOCUMENTS

| | | |
|---|---|---|
| 7,162,215 B2 | 1/2007 | Videtich et al. |
| 7,369,825 B2 | 5/2008 | Slupe |
| 7,801,500 B2 | 9/2010 | Kraft et al. |
| (Continued) | | |

FOREIGN PATENT DOCUMENTS

WO    2015162294 A1    10/2015

OTHER PUBLICATIONS

Youssef, et al., "Computing Location from Ambient FM Radio Signals"; IEEE Comunications Society, Wireless Communicatisn and Networking Conference; Mar. 13-17, 2005, vol. 2, pp. 824-829.

(Continued)

*Primary Examiner* — Lee Nguyen
(74) *Attorney, Agent, or Firm* — Cantor Colburn LLP; Steven Chiu (57) ABSTRACT

An embodiment of a method of selecting a radio broadcast includes detecting a radio broadcast and retrieving user preference data, the user preference data specifying one or more preferred radio stations and/or one or more preferred categories of radio broadcast. The method also includes communicating via a local communication device with at least one additional processing device, wherein communicating includes retrieving radio station category information specifying at least one radio station and a category of the at least one radio station. The method further includes correlating the radio station category information with the detected radio broadcast to identify a radio station that originated the radio broadcast and one or more categories associated with the radio station and/or the radio broadcast, and based on determining that the detected radio broadcast corresponds to the user preference data, displaying information describing the detected radio broadcast and/or controlling the radio receiver.

12 Claims, 6 Drawing Sheets

(56) References Cited

U.S. PATENT DOCUMENTS 8,165,546 B2     4/2012   Ingrassia et al.
8,934,845 B2     1/2015   Weng

OTHER PUBLICATIONS

Eli M. Dow, et al., "Radio Locator Application", U.S. Appl. No. 15/180,601, filed Jun. 13, 2016.
List of IBM Patents or Patent Applications Treated as Related; POU920150378US1, Date Filed Jan. 13, 2016, pp. 1-2.

RADIO LOCATOR APPLICATION

BACKGROUND

The present invention relates generally to radio receiver control, and more specifically, to control and monitoring of a radio receiver to facilitate finding available and preferred radio stations.

Despite developments in radio such as satellite and Internet radio, terrestrial or broadcast radio remains ubiquitous. In selecting a radio station, a user typically tunes or scans for available radio stations using a radio receiver, and manually selects a station. This can be inconvenient especially when a user is traveling in a geographic region in which he or she is not familiar with the local stations, requiring manually tuning and listening to a broadcast in order to decide whether the broadcast is of interest.

SUMMARY

An embodiment of a method of selecting a radio broadcast includes detecting a radio broadcast received by a radio receiver in a vehicle and retrieving, by a processing device, user preference data selected by a user, the radio receiver configured to receive and play terrestrial radio signals, and the user preference data specifying one or more preferred radio stations, one or more preferred categories of radio broadcast, or a combination thereof. The method also includes communicating via a local communication device with at least one additional processing device, wherein communicating includes retrieving radio station category information stored by the at least one additional processing device, the radio station category information specifying at least one radio station and a category of the at least one radio station. The method further includes correlating the radio station category information with the detected radio broadcast to identify a radio station that originated the radio broadcast and one or more categories associated with the radio station, the radio broadcast, or a combination thereof, and based on determining that the detected radio broadcast corresponds to the user preference data, performing displaying information describing the detected radio broadcast, controlling the radio receiver, or a combination thereof.

An embodiment of an apparatus for selecting a radio broadcast includes a processing device configured to communicate with a radio receiver in a vehicle, the radio receiver configured to receive and play terrestrial radio signals, and also includes a local communication device and a processing module. The processing module is configured to perform detecting a radio broadcast received by the radio receiver, and retrieving user preference data selected by a user, the user preference data specifying one or more preferred radio stations, one or more preferred categories of radio broadcast, or a combination thereof. The processing module is also configured to perform communicating via the local communication device with at least one additional processing device, wherein communicating includes retrieving radio station category information stored by the at least one additional processing device, the radio station category information specifying at least one radio station and a category of the at least one radio station. The processing module is further configured to perform correlating the radio station category information with the detected radio broadcast to identify a radio station that originated the radio broadcast and one or more categories associated with the radio station, the radio broadcast or a combination thereof, and based on determining that the detected radio broadcast corresponds to the user preference data, performing displaying information describing the detected radio broadcast, controlling the radio receiver, or a combination thereof.

An embodiment of a computer program product for selecting a radio broadcast includes a computer readable storage medium having program instructions embodied therewith, wherein the computer readable storage medium is not a signal, the program instructions readable by a processing circuit to cause the processing circuit to perform a method. The method includes detecting a radio broadcast received by a radio receiver in a vehicle, the radio receiver configured to receive and play terrestrial radio signals, and retrieving, by a processing device, user preference data selected by a user, the user preference data specifying one or more preferred radio stations, one or more preferred categories of radio broadcast, or a combination thereof. The method also includes communicating via a local communication device with at least one additional processing device, wherein communicating includes retrieving radio station category information stored by the at least one additional processing device, the radio station category information specifying at least one radio station and a category of the at least one radio station. The method further includes correlating the radio station category information with the detected radio broadcast to identify a radio station that originated the radio broadcast and one or more categories associated with the radio station, the radio broadcast, or a combination thereof, and based on determining that the detected radio broadcast corresponds to the user preference data, performing displaying information describing the detected radio broadcast, controlling the radio receiver, or a combination thereof.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Apparatuses, systems and methods are provided for detecting radio broadcast signals and selecting radio broadcasts based on user preferences. An embodiment of a device (e.g., a mobile device such as a smartphone) is configured to detect available radio broadcasts, retrieve category information to identify the broadcasts and determine one or more categories associated with the broadcast, and compare the category information to user preference data to select one or more preferred broadcasts. In one embodiment, the device is configured to perform one or more of various actions, such as displaying preferred broadcasts, tuning a radio receiver and programming receiver presets. In one embodiment, the device includes a local communication device or component (e.g., a Bluetooth device) and is configured to communicate locally with other devices to retrieve the category information.

Figure 1:
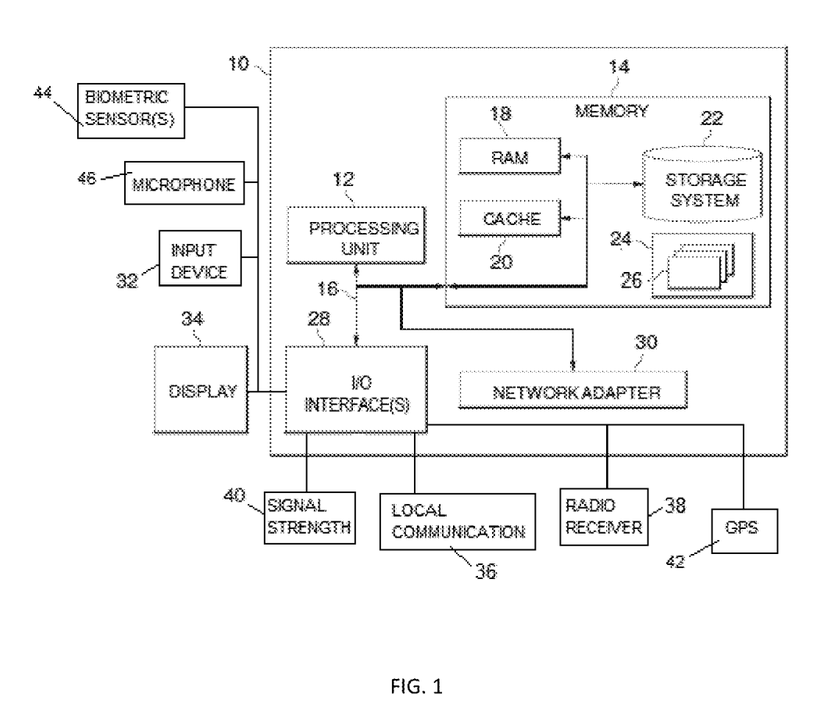
FIG. 1 depicts a processing device in accordance with an embodiment.

FIG. 1 illustrates an example of a computing device 10 that can be used to perform various actions, including receiving and processing user inputs and performing various processing actions as described herein, including storing and processing data, executing programs and displaying information. The device 10 may be configured to receive or gather communications (e.g., data, text, spoken words, emails, authentication information, etc.) from other locations, such as a network (e.g., Internet) and/or another processor (e.g., server, computer or mobile device). The device 10 may be any device capable of receiving input from users, sensors and/or other devices, performing processing actions and displaying text and other information to a user. Examples of the device 10 include as a mobile device (e.g., a smartphone), a wearable device (e.g., a smartwatch), a tablet computer, a laptop computer, a desktop computer, a mainframe a server and others.

The device 10 includes various components and/or modules for performing various processing, sensing and display functions. The device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein. The program 24 and/or program modules 26, in one embodiment, are configured as a radio location application as described further herein (e.g., a smartphone or tablet application or "app").

The device 10 includes or is connected to various components, which may be incorporated in the device 10 or external to the device 10. The device 10 includes interfaces 28 for communication with components and may also include a network adapter 30 (e.g., a 3G/4G modem) for communication with other devices or components over a suitable network or remote connection. The device 10 is connected to or includes at least one input device 32 such as a touchscreen, keyboard, button and/or mouse, and a display 34. The input device 32 can be incorporated with the display 34, e.g., as a touchscreen. The components shown in FIG. 1 and described herein are provided for illustrative purposes and are not intended to be limiting.

The device 10 also includes a wireless communication device 36 such as an antenna assembly for transmitting and receiving local communications, such as Bluetooth, Wi-Fi and/or near field communication (NFC) components. Local communications are distinguished from remote communications, by which communication is over a remote network such as a cellular network or Internet communications. Local communications include communication protocols and techniques such as Bluetooth, Ethernet, local Wi-Fi communications (e.g., between devices with range of a Wi-Fi hotspot or signal source).

Another component includes a radio receiver 38, which can be incorporated into the device 10, connected to the device 10 or incorporated in a separate radio receiver device such as a vehicle radio. The radio receiver 38 may be a radio tuner included in or connected to the device (e.g., an in-phone radio tuner or a radio or stereo connected wirelessly). In one embodiment, the radio receiver 38 is part of a vehicle (e.g., a car stereo system). A radio signal strength sensor 40 may likewise be incorporated in the device 10 or in a separate device such as a vehicle radio.

The device 10 may also include or be configured to connect to a location device or system, such as a global positioning system (GPS) device 42. Various other components may be incorporated in the device 10. For example, one or more biometric sensors 44 (e.g., a camera, an optical sensor, an acoustic sensor and/or a capacitive sensor) can be used for recording biometric characteristics such as fingerprints, vital signs, facial features and others. A microphone 46 or other sound recording device may be included for recording voice commands and recording changes in voice or other audible indicators, and a speaker 46 may be included for outputting audible communications and/or radio station signals.

Figure 2:
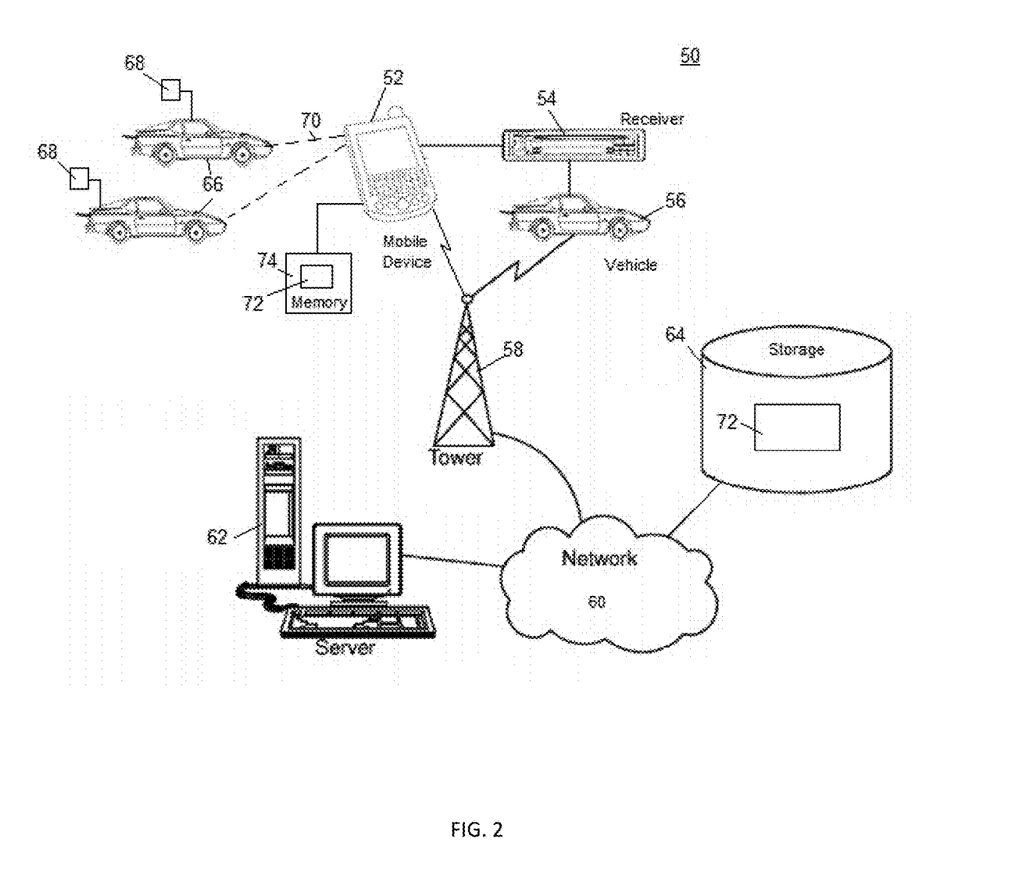
FIG. 2 depicts an example of a processing environment in which a processing device may be used to perform embodiments described herein.

FIG. 2 illustrates an operating environment 50 in which the device 10 can be operated to perform the various methods and embodiments described herein. In this embodiment, the device 10 is a smartphone or other mobile device 52. The smartphone 52 is configured to communicate with a radio receiver 54 in a vehicle 56. Communication between the smartphone 52 and the radio receiver 54 can be accomplished wirelessly (e.g., via Bluetooth) or by a wired connection. Although embodiments described herein generally describe the radio location application as stored in the smartphone 52, the radio location application can be installed in a processor in the radio receiver 54.

The smartphone 52 and/or radio receiver 54 includes components to communicate over a cellular network via a cellular tower 58, to connect to other devices using telephone communications and/or data links. For example, a network 60 such as the Internet is accessed to communicate with other devices, such as one or more servers 62 and one or more databases 64. The tower 58 and/or network 60 may also be used to communicate with devices located within other vehicles 66, such as radio receivers and/or mobile devices (e.g., smartphones) 68 held by users operating the other vehicles 66.

The network 60 may connect devices configured to perform radio location processes with remote data sources and devices, such as servers 62. Such servers may be running websites or data repositories that can be used to compile information regarding radio stations available to a user. For example, the network 60 can connect the device 52 to websites operated by individual radio stations or groups of radio stations, review sites or any other sources of information relevant to radio stations.

In one embodiment, the network adapter 30 or other suitable component is configured to communicate with other devices using a local communication device and method, such as a wireless peer-to-peer network. For example, the device 10 includes programs and hardware to enable a mobile device to communicate as a peer to other devices connected by a local wireless connection 70 or network, such as a Bluetooth cluster.

A vehicle radio receiver such as the receiver 54 may include various components, such as a processor, memory, display, wireless communication capabilities (e.g., Bluetooth), GPS navigation capabilities, and/or features that enable synchronization with mobile devices. In such a case, the embodiments described herein can utilize one or more of these components to perform radio location functions as described herein.

Information regarding available radio stations may be stored locally in a device memory and/or remotely at a suitable location. For example, radio station category information 72 can be stored in a device memory 74 and/or remote location such as the database 64. The radio station data can be retrieved from remote sources such as the server 62 and devices connected to the network 60, and/or retrieved from other devices 68 using the local communication link 70.

Figure 3:
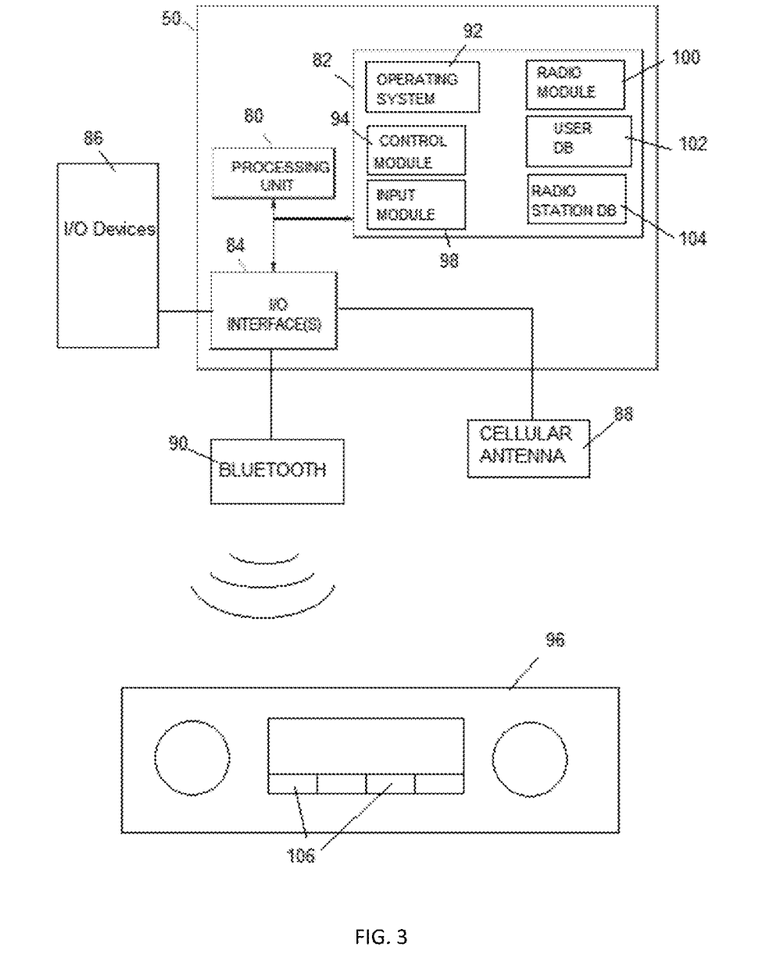
FIG. 3 depicts examples of processing modules configured to perform aspects of embodiments described herein.

FIG. 3 illustrates an embodiment of a program suite that includes various processing modules configured to perform aspects of the methods described herein. The program suite in this embodiment is embodied in the device 10 and or the mobile device 52, but can be embodied in any suitable processing device or system.

The mobile device 52 includes a processor or processing unit 80 connected to a memory 82 and various components (e.g., those shown in FIG. 1) via one or more appropriate interfaces 84. For example, the interfaces 84 connect the processing unit 80 to input/output devices 86 and communication devices such as a cellular communication device 88 (e.g., cellular transmitter and/or receiver antenna) and a local communication device 90 such as a Bluetooth transmitter/receiver. One or more processing modules are stored in the memory, including an operating system 92 and stored programs and applications.

A control module 94 is configured to perform functions including detecting radio broadcast signals, collecting radio station information, receiving user preferences, outputting radio station information and communicating with and/or controlling functions of a radio receiver 96.

An input module 98 receives input from a user and/or other device. For example, the input module 98 receives input data regarding user identification and preferences, location information and radio station information. The input module 98 may also receive inputs such as radio broadcast signals and signal strength data.

A radio module 100 may perform functions such as receiving detected broadcast signal data, including signal frequency and/or modulation, as well as signal strength. The radio module 100 communicates with one or more databases or other storage locations, such as a user preferences database 102 that stores user identification and preference information, and a radio station database 104 that stores a list (or other data structure) of a number of radio stations along with category information if available. It is noted that the functionality described herein is not limited to the specific modules and databases. For example, the control module 98 may perform functions described above related to the radio module 100.

Based on detecting available radio stations and evaluating user preferences, the radio module 100 determines one or more preferred or selected radio station broadcasts and transmits this information to the control module 94, which can send commands to an I/O device 86 such as a touchscreen, and/or send command signals to control the receiver 96 incorporated in, e.g., a vehicle. For example, control of the radio receiver 96 includes tuning the receiver to a selected radio station and/or setting values for one or more presets 106, each preset storing a selected radio station so that the user can select the radio station by pushing a button or icon without having to tune through other frequencies.

FIGS. 4-7 illustrate various embodiments of a method of selecting a broadcast radio station. The methods may be performed by a processor or processors disposed in a mobile device, such as a smartphone, tablet, smartwatch etc. For example, the method may be performed by the mobile device 52.

Figure 4:
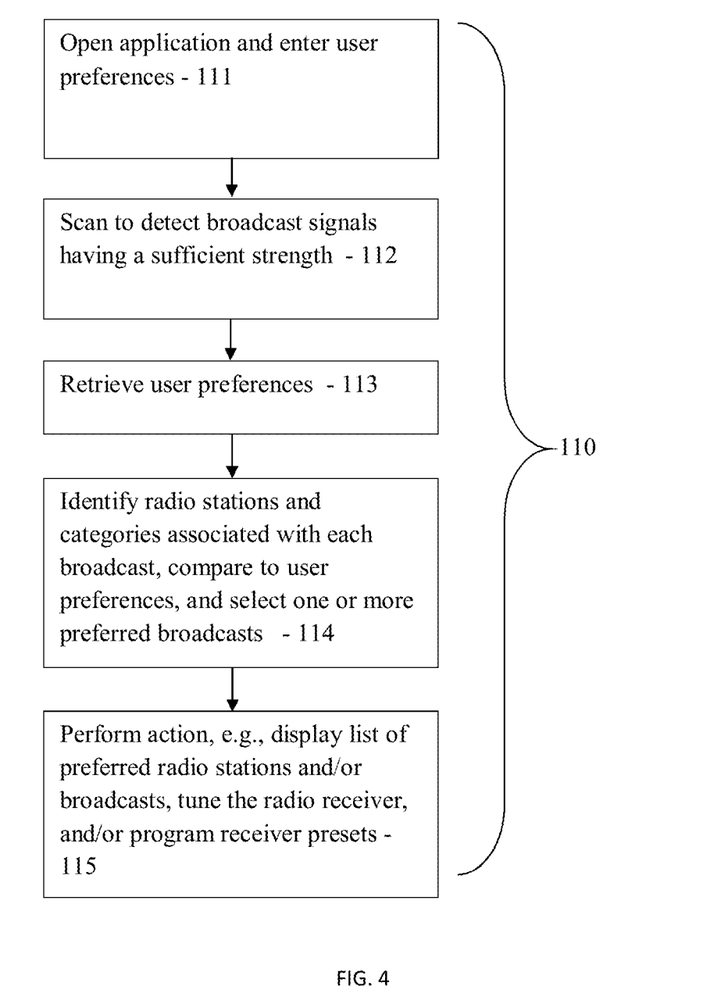
FIG. 4 is a flow diagram depicting an embodiment of a method of detecting and selecting radio station broadcasts.
Figure 5:
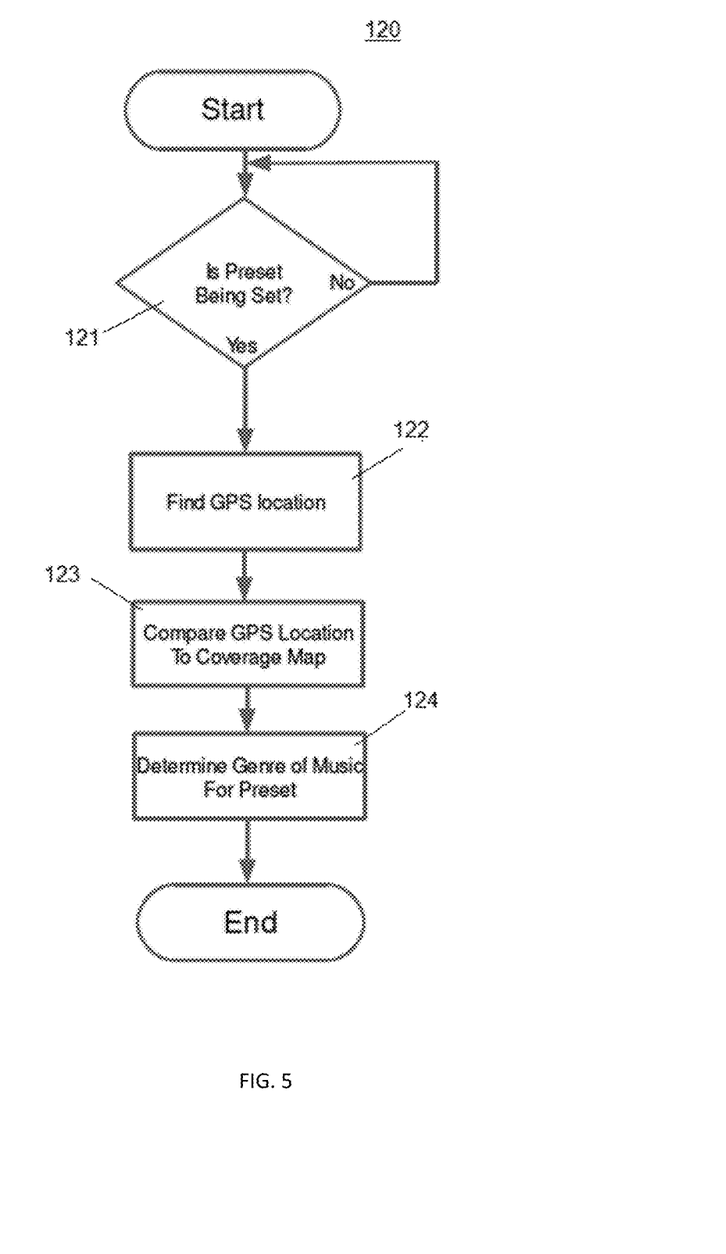
FIG. 5 is a flow diagram depicting an embodiment of a method of detecting and selecting radio station broadcasts, which includes identifying a geographic location.
Figure 6:
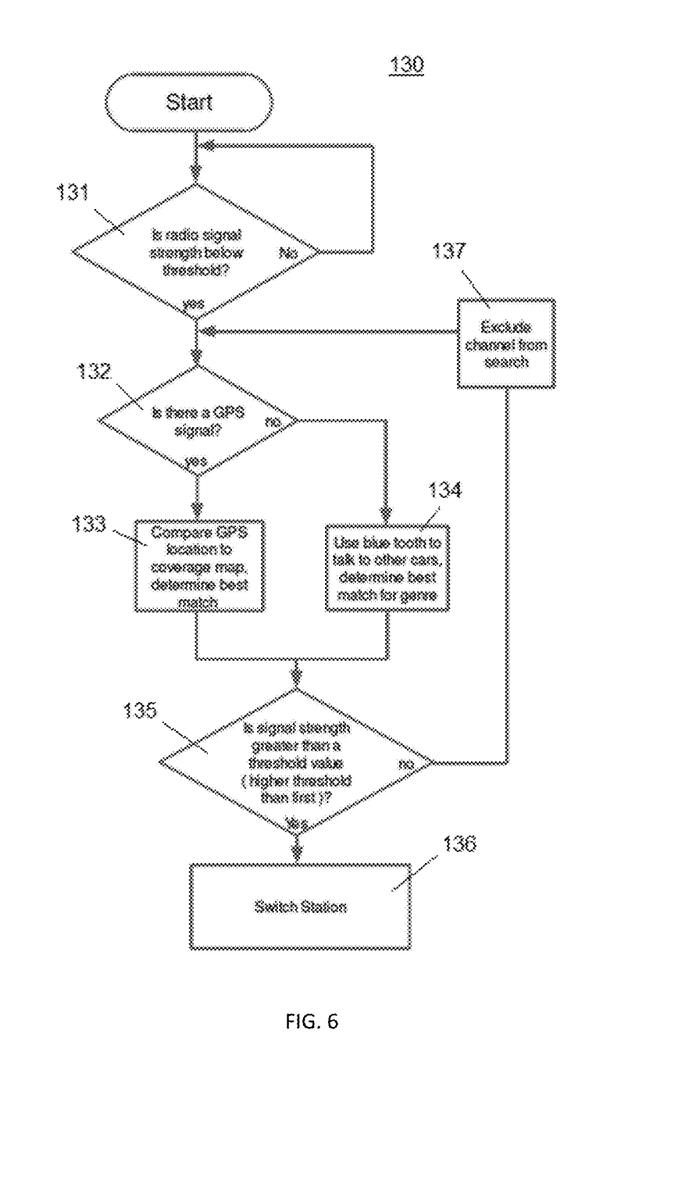
FIG. 6 is a flow diagram depicting an embodiment of a method of detecting and selecting radio station broadcasts, which includes identifying a geographic location and/or retrieving radio station information using local communication.

In one embodiment, the method is performed by a processor running a radio location application downloaded onto a user device such as a smartphone or tablet, or loaded or stored in a vehicle radio receiver. Other services such as GPS and signal strength measurements may be separate applications stored in the user device and/or vehicle receiver, or be incorporated as part of the radio location application. The user, after initially acquiring the application, registers or subscribes and provides identifying information (e.g., username) and optionally additional information for security purposes. As discussed further herein, the application includes capability to locate and communicate wirelessly with other devices (mobile or vehicle integrated) that have loaded the application.

FIG. 4 illustrates an embodiment of a method 110 of controlling a radio receiver by a processing device such as the mobile device. The method 110 includes a plurality of stages represented by blocks 111-115, all of which can be performed sequentially. However, in some embodiments, one or more of the stages can be performed in a different order than that shown or fewer than the stages shown may be performed.

At block 111, a user opens the radio location application using a processor embodied in, e.g., a mobile device such as a smartphone. In one embodiment, the user inputs or updates/changes his or her preferences for characteristics of radio programs that the user would like to listen to if available. The preferences are input as user preference data or user preference information that specifies one or more preferred radio stations and/or one or more preferred categories of radio broadcast. Any number or type of preference can be input. For example, the processor displays options for categories such as radio station format and genre. The categories can be hierarchical, e.g., a preferred format can be input, and subcategories can be input for each format. Furthermore, the categories can be ranked by the user.

Radio station format refers to a broad categories such as music, talk, AM and FM. Genres may be selected to further refine the categories. For example, talk radio genres may include news, politics, sports, religious, etc. Music genres include, for example, rock, rap, country, and any other category of music. For example, if the user enters a preference for talk radio, the mobile device provides an option to select a genre such as politics, news, sports, comedy, etc. Likewise, if the user enters a music format, the processor provides an option to select a genre such as rock, rap, alternative, R&B, classic rock, oldies, etc. Further subcategories can also be included. For example, the rock genre may include further subcategories such as hard rock, classic rock, soft rock, etc. The user preference data may also include identification of particular radio stations, particular shows, and particular broadcasters (talk show hosts, DJs).

The number and type of categories is not limited and may be any type of category that allows a user to customize broadcast selections.

At block 112, the device scans or controls a vehicle receiver to scan for available radio broadcasts by detecting broadcast signals. Scanning may be performed continuously, periodically, or in response to a detected condition such as a change in signal strength or entry into a geographic area. The vehicle receiver may be a car stereo system, although the receiver may be embodied in any suitable form (e.g., a portable stereo receiver or home stereo).

The signals may be purely analog or may be a digital signal (e.g., an HD radio signal). In the case of a digital signal, the radio signal may include not only audio, but also data (e.g., metadata) that identifies the radio station and may provide other information such as category or genre.

The mobile device selects radio broadcast signals by detecting, e.g., the frequency or modulation of the received signal. In one embodiment, a signal strength detector such as the strength sensor 40 may be used to detect broadcast signals having a magnitude or strength that is greater than a threshold. The threshold may be selected so that only signals that can be clearly heard by a user are selected.

At block 113, the mobile device retrieves user preference data for comparison with radio broadcasts detected via the receiver. The user preference data specifies one or more preferred radio stations and/or one or more preferred categories of radio broadcast, including preferred formats and/or genres. In addition, the user preference data can specify individual broadcasts or shows, such as talk radio hosts, radio series, sporting events and others. The user preference data may be stored in the mobile device (e.g., in memory 74) or accessible from a remote location (e.g., the database 64).

At block 114, the detected broadcast signals are each identified as being associated with a particular source, e.g., a particular radio station. In addition, the mobile device retrieves radio station category information. As described herein, "radio station category information" includes any retrievable information that allows the device to identify a radio broadcast (i.e., identify the station that transmitted the broadcast) and/or that allows the device to correlate a radio broadcast with one or more categories, e.g., format, genre, identification of a specific show (e.g., a radio series such as a specific talk show) and/or identification of a specific event (e.g., a sporting event or concert). The identified broadcasts are correlated with specific radio stations that generated each broadcast by retrieving radio station category information.

Radio station category information may be retrieved from any of a variety of sources and/or combination of sources. In one embodiment, if metadata is received with a radio broadcast, the device stores the broadcast signal and uses the metadata to associate the broadcast with the category information.

In some cases, the mobile device may already have stored the appropriate identification and category data. This may occur due to the user inputting the information based on his or her knowledge, or due to the device having previously been through the geographic area and retrieved the information.

In one embodiment, the mobile device uses a cellular and/or data communication (e.g., Wi-Fi if available) to access remote sources. Examples of remote sources include data stored at, e.g., one or more servers, and accessible via one or more websites. For example, the device can search for websites that describe a station and broadcast schedule, such as a radio station's website, a review site or any other website that provides information regarding radio stations.

In one embodiment, retrieving the information includes communicating with one or more additional devices using a local communication device or system. For example, the device continuously, periodically or sporadically (or in response to detecting new broadcasts) broadcasts a local signal such as a Bluetooth signal over an area surrounding the device. The area can be relatively small (e.g., less than ten feet) or larger (e.g., potentially greater than five miles).

For example, the device broadcasts a signal that requests category information and describes communication parameters that specify the communication protocol and the radio location application. If an additional device, such as a mobile device or radio in another vehicle traveling within the broadcast range, detects the signal and is running an instance of the radio location application, the additional device responds by transmitting category information stored by the additional device. The category information may include a list of radio stations identified by the additional device, the categories of stations and or broadcasts, and/or a geographic region associated with the radio stations. The list of radio stations may correspond to the presets that are currently programmed into the radio receiver of the other vehicle.

At block 115, the device performs an action such as displaying a list of available radio broadcasts along with identification and/or category information to the user. The user then may then select a desired broadcast by directly controlling the receiver or using the device to control the receiver.

In one embodiment, the mobile device itself controls the receiver, either in response to user input or automatically in response to detecting a radio broadcast that conforms to user preferences. As discussed above, the user preferences may be hierarchical, and thus the device may select from multiple stations that satisfy user preferences to determine the most preferred station. For example, the device may automatically tune the receiver to play a preferred broadcast. In another example, the device may program the receiver's presets to include one or more preferred stations. The presets may be displayed on the receiver or displayed by the device.

FIGS. 5 and 6 illustrate embodiments of a method of controlling a vehicle radio by a processing device. In these embodiments, the methods are similar to the method 100. In these embodiments, additional information such as geographic information is used to facilitate detection of broadcast signals, identification of broadcasts, retrieval of preference data and/or control of a radio receiver.

FIG. 5 shows an embodiment of a method 120, which includes a plurality of stages represented by blocks 121-124, all of which can be performed sequentially. However, in some embodiments, one or more of the stages can be performed in a different order than that shown or fewer than the stages shown may be performed.

Method 120 (and other embodiments where appropriate) may be performed as the mobile device is stationary or moving. For example, the method is performed during vehicle travel, although the method may be performed in the context of other types of movement, such as while a user is walking or running, while a user is on a bus, train or other form of transit.

At block 121, the mobile device determines whether a radio receiver is to be tuned or presets are to be programmed. This can be determined based on user input, such as a user request by pushing an icon on the mobile device, or based on preselected conditions under which the receiver should be tuned or programmed, such as a radio signal becoming too faint, the device entering a geographic area and/or new radio broadcasts becoming available.

At block 122, a geographic location is determined using any suitable device. For example, the mobile device or a separate device, such as a GPS navigation device (embodied in a portable device or incorporated into the vehicle) detects the location and transmits the device location to the device.

At block 123, stored radio station data is retrieved or inspected that identifies available radio stations and broadcasts that can be received within a geographic area that includes the device location. An example of such data is a radio station coverage map, which can be retrieved from the device memory, from a remote location (e.g., website(s)) or from other devices within a local communication range such as other vehicles traveling near the device and with a range of a Bluetooth or other local communication device.

At block 124, radio station category information can be obtained from sources discussed at block 123. For example, the coverage map may include category and/or identification information. The category information is compared to user preferences, and if an available broadcast is found that conforms to a user preference, the device may tune the receiver or add the broadcasts to the receiver presets.

FIG. 6 shows an embodiment of a method 130, which includes a plurality of stages represented by blocks 131-137, all of which can be performed sequentially. However, in some embodiments, one or more of the stages can be performed in a different order than that shown or fewer than the stages shown may be performed.

At block 131, the mobile device monitors the signal strength of a broadcast that is currently being played, e.g., by a vehicle radio receiver. This monitoring can be performed continuously, periodically or in any other manner. In one embodiment, a signal strength sensor such as a single loop antenna is incorporated into the mobile device or the radio receiver and used to monitor signal strength.

If the signal strength falls below a selected threshold, the mobile device commences searching for other available broadcasts.

At block 132, the mobile device determines whether geographic location information is available. For example, the mobile device determines whether the radio receiver, the mobile device itself, or a separate device has GPS or other location capabilities.

At block 133, if location information is available, the mobile device determines the location of the device, and compares the location to any suitable data, which may be stored in the mobile device or at a remote location. For example, the location is compared to a coverage map that identifies radio stations and corresponding broadcasts that are in a region corresponding to the location of the device. The user preference data is compared to the coverage map and/or any other available information to select a broadcast that corresponds to user preferences.

At block 134, if location information is not available, the mobile device transmits a local signal, such as a Bluetooth signal, to a surrounding area. If one or more other devices, e.g., located in other vehicles nearby, detect the signal and are running the radio location application, the one or more other devices transmit return signals that include radio station category information. This information includes, e.g., information stored in the other device and/or information describing the radio broadcasts, stations and/or category information that is programmed into the radio receiver of the other vehicle. The user preference data is compared to this information to select a broadcast.

It is noted that, although use of geographic location data and local communication are described in this embodiment as alternatives, these functions can be performed in conjunction with one another or in a complementary manner.

At block 135, the mobile device detects a signal strength associated with the selected broadcast. The signal strength is compared to a selected threshold, which may be the same as or different from the threshold described at block 131.

At block 136, if the signal strength meets or exceeds the threshold, the mobile device switches or directs the receiver to switch to the selected broadcast.

At block 137, if the signal strength does not meet or exceed the threshold, the selected broadcast is excluded from further selection. The method is then repeated until a selected broadcast having a sufficient signal strength is found.

Technical effects and benefits include the ability to automatically detect available radio broadcasts and select broadcasts according to user preferences. In addition, embodiments described herein do not require a centralized server and can be implemented into any vehicle using a localized communication method without requiring an Internet connection or cellular data plan. In addition to such embodiments being advantageous when a data link is not available, such embodiments are also advantageous in that they do not require communication with central servers that could be susceptible to commercial interest and thereby could reduce the quality of the information used to determine preferred stations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for selecting a radio broadcast, the apparatus comprising:

a processing device configured to communicate with a radio receiver in a vehicle, the radio receiver configured to receive and play terrestrial radio signals;
a local communication device; and
a processing module configured to perform:
detecting a radio broadcast received by the radio receiver;
retrieving user preference data selected by a user, the user preference data specifying one or more preferred radio stations, one or more preferred categories of radio broadcast, or a combination thereof;
communicating via the local communication device with at least one additional processing device, wherein communicating includes retrieving radio station category information stored by the at least one additional processing device, the radio station category information specifying at least one radio station having a broadcast range that includes a geographic region that the vehicle is in, and a category of the at least one radio station;
correlating the radio station category information with the detected radio broadcast to identify a radio station that originated the radio broadcast and one or more categories associated with the radio station, the radio broadcast or a combination thereof; and
based on determining that the detected radio broadcast corresponds to the user preference data, performing displaying information describing the detected radio broadcast, controlling the radio receiver, or a combination thereof.

2. The apparatus of claim 1, wherein the additional processing device is located in an additional vehicle, and the retrieved radio station category information is stored in a mobile device in the vehicle, the radio receiver in the vehicle or a combination thereof.

3. The apparatus of claim 2, wherein the radio station category information includes presets programmed into the radio receiver in the additional vehicle.

4. The apparatus of claim 1, wherein the local communication device is a Bluetooth device.

5. The apparatus of claim 1, wherein communicating includes broadcasting a communication signal over an area corresponding to a range of the local communication device, receiving reply signals from one or more additional processing devices, and requesting the radio station category information.

6. The apparatus of claim 1, wherein the processing module is configured to measure a strength of each broadcast signal detected, and compile a list of available radio stations, the available radio stations emitting a broadcast signal having a strength above a selected threshold.

7. The apparatus of claim 1, wherein the processing device is configured to execute a radio station locator application, and communicating with the at least one additional device includes establishing whether the at least one additional device stores an instance of the radio station locator application.

8. The apparatus of claim 1, wherein the processing module is configured to perform:
monitoring a first signal strength of a current radio station broadcast being played by the radio receiver, and in response to determining that the first signal strength is below a first threshold, performing:
automatically identifying available radio broadcasts based on stored data identifying radio stations having broadcast ranges that include a geographic region that the vehicle is in, radio station data received from the at least one additional processing device, or a combination thereof;
comparing the available radio broadcasts to the user preferences;
in response to identifying a broadcast conforming to the user preferences, measuring a second signal strength of the identified broadcast; and
in response to the second signal strength being greater than a second threshold, automatically tuning the radio receiver to the identified broadcast.

9. A computer program product for selecting a radio broadcast, the computer program product comprising:
a computer readable storage medium having program instructions embodied therewith, wherein the computer readable storage medium is not a signal, the program instructions readable by a processing circuit to cause the processing circuit to perform a method comprising:
detecting a radio broadcast received by a radio receiver in a vehicle, the radio receiver configured to receive and play terrestrial radio signals;
retrieving, by a processing device, user preference data selected by a user, the user preference data specifying one or more preferred radio stations, one or more preferred categories of radio broadcast, or a combination thereof;
communicating via a local communication device with at least one additional processing device, wherein communicating includes retrieving radio station category information stored by the at least one additional processing device, the radio station category information specifying at least one radio station having a broadcast range includes a geographic region that the vehicle is in, and a category of the at least one radio station;
correlating the radio station category information with the detected radio broadcast to identify a radio station that originated the radio broadcast and one or more categories associated with the radio station, the radio broadcast, or a combination thereof; and
based on determining that the detected radio broadcast corresponds to the user preference data, performing displaying information describing the detected radio broadcast, controlling the radio receiver, or a combination thereof.

10. The computer program product of claim 9, wherein the additional processing device is located in an additional vehicle, and the retrieved radio station category information is stored in a mobile device in the vehicle, radio receiver in the vehicle, or a combination thereof.

11. The computer program product of claim 9, wherein the method further comprises measuring a strength of each broadcast signal detected, and compiling a list of available radio stations, the available radio stations emitting a broadcast signal having a strength above a selected threshold.

12. The computer program product of claim 9, wherein the method further comprises monitoring a first signal strength of a current radio station broadcast being played by the radio receiver, and in response to determining that the first signal strength is below a first threshold, performing:
automatically identifying available radio broadcasts based on stored data identifying radio stations having broadcast ranges that include a geographic region that the vehicle is in, radio station data received from the at least one additional processing device, or a combination thereof;
comparing the available radio broadcasts to the user preferences;
in response to identifying a broadcast conforming to the user preferences, measuring a second signal strength of the identified broadcast; and in response to the second signal strength being greater than a second threshold, automatically tuning the radio receiver to the identified broadcast.

\* \* \* \* \*